United States Patent
Nieuwlands et al.

(10) Patent No.: US 10,762,388 B2
(45) Date of Patent: Sep. 1, 2020

(54) LIGHTING PLAN GENERATOR

(71) Applicant: SIGNIFY HOLDING B.V., Eindhoven (NL)

(72) Inventors: Eric Johannes Hendricus Cornelis Maria Nieuwlands, Eindhoven (NL); Shiquan Wang, Shanghai (CN); Qin Zhao, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 16 days.

(21) Appl. No.: 15/568,033

(22) PCT Filed: Apr. 18, 2016

(86) PCT No.: PCT/EP2016/058529
§ 371 (c)(1),
(2) Date: Oct. 20, 2017

(87) PCT Pub. No.: WO2016/169884
PCT Pub. Date: Oct. 27, 2016

(65) Prior Publication Data
US 2018/0144213 A1      May 24, 2018

(30) Foreign Application Priority Data

Apr. 22, 2015   (WO) ................ PCT/CN2015/077146
May 19, 2015   (EP) ..................................... 15168127

(51) Int. Cl.
*G06K 9/62*        (2006.01)
*G06T 7/73*        (2017.01)
(Continued)

(52) U.S. Cl.
CPC ............. *G06K 9/6232* (2013.01); *G01S 3/78* (2013.01); *G06K 9/32* (2013.01); *G06K 9/46* (2013.01);
(Continued)

(58) Field of Classification Search
None
See application file for complete search history.

(56) References Cited

U.S. PATENT DOCUMENTS

| 6,359,617 B1 | 3/2002 | Xiong | |
|---|---|---|---|
| 2003/0235344 A1* | 12/2003 | Kang | ....................... G06K 9/32 382/284 |

(Continued)

FOREIGN PATENT DOCUMENTS

| WO | 2011073933 A2 | 6/2011 |
|---|---|---|
| WO | 2013054221 A1 | 4/2013 |
| WO | 2014096198 A1 | 6/2014 |

OTHER PUBLICATIONS

Jun Wu et al., "Automatic Retrieval of Optimal Texture From Aerial Video for Phto-Realistic 3D Visualization of Street Environment," Fourth International Conference on Image and Graphics, 2007 (5 Pages).

*Primary Examiner* — Leon Viet Q Nguyen
(74) *Attorney, Agent, or Firm* — Meenakshy Chakravorty

(57) ABSTRACT

A lighting plan generator configured to generate a lighting plan comprising a map of locations of a plurality of light units located on a ceiling of an interior space, the lighting plan generator being configured to generate the lighting plan from overlapping images captured by a mobile device from different locations as the mobile device moves through the interior space. The lighting plan generator comprises: an input configured to receive at least two images, the at least two images comprising at least partially overlapping areas; an image rectifier (160) configured to rectify the at least two images; an image data combiner (406) configured to combine data from the rectified at least two images, wherein a lighting plan (413, 415) is generated from the combined data from the rectified at least two images.

10 Claims, 13 Drawing Sheets

(51) Int. Cl.
  *H05B 47/10*   (2020.01)
  *H05B 47/155*  (2020.01)
  *G06T 7/30*    (2017.01)
  *G01S 3/78*    (2006.01)
  *G06K 9/32*    (2006.01)
  *G06K 9/46*    (2006.01)
  *G06Q 10/06*   (2012.01)

(52) U.S. Cl.
  CPC ........... *G06Q 10/0631* (2013.01); *G06T 7/30* (2017.01); *G06T 7/74* (2017.01); *H05B 47/10* (2020.01); *H05B 47/155* (2020.01); *G06T 2207/30252* (2013.01)

(56) References Cited

U.S. PATENT DOCUMENTS

| | | | | |
|---|---|---|---|---|
| 2014/0265878 A1* | 9/2014 | Gritti | ............... | H04B 10/116 |
| | | | | 315/153 |
| 2015/0091446 A1* | 4/2015 | Ohta | ............... | H05B 47/155 |
| | | | | 315/153 |
| 2016/0071486 A1* | 3/2016 | Byers | ............... | G06F 3/013 |
| | | | | 345/690 |
| 2016/0359559 A1 | 12/2016 | Baggen et al. | | |

* cited by examiner

LIGHTING PLAN GENERATOR

CROSS-REFERENCE TO PRIOR APPLICATIONS

This application is the U.S. National Phase application under 35 U.S.C. § 371 of International Application No. PCT/EP2016/058529, filed on Apr. 18, 2016, which claims the benefit of European Patent Application No. 15168127.7, filed on May 19, 2015 and International Application No. PCT/CN2015/077146, filed on Apr. 22, 2015. These applications are hereby incorporated by reference herein.

TECHNICAL FIELD

The present disclosure relates to a lighting plan generator system and method for generation of a lighting plan based on combining images or image data. Particularly the present disclosure relates to a lighting plan generator system and method for generating a lighting plan based on combining the image data either by blending images or extracted image data. The present disclosure relates to the use of such generated lighting plans for inspection purposes or commissioning purposes.

BACKGROUND

Generating a lighting plan for a large area installation is a useful operation for many reasons.

Monitoring or managing a large (retail) area filled with many light units (for example 500 to 1500 light units within a 50 m² area) benefits from an accurately determined lighting plan. For example for commissioning purposes the lighting plan may be checked against the installation plan to determine whether all of the light units have been correctly installed. Similarly for inspection purposes the lighting plan may be compared against a previously determined lighting plan to check whether there has been a change in the performance of the light units and thus identify where light units should be replaced or repaired.

Furthermore the accurately determined lighting plan may have other uses such as enabling an indoor positioning system. The indoor positioning system may allow users to identify their location relative to a 'known' position of the light units determined from the lighting plan. The indoor positioning system may for 'internal space' applications provide superior performance over conventional radio frequency positioning systems such as satellite (GPS) and/or cellular positioning systems.

Although an initial installation plan may provide an expected lighting plan, this initial lighting plan may comprise errors. For example light units may be installed at different locations to the originally planned location (for example because of some structural problem in the building). Similarly some light units may be incorrectly installed or swapped with other light units during the lighting system installation process.

The initial lighting plan may therefore not be suitable for the task it is to be used in. For example in an indoor positioning system the lighting plan should have the position of the light units to within 10 to 20 cm in the X, Y and Z dimensions.

Such errors therefore require a post installation lighting plan to be determined. Conventionally this is generated manually and often by using a paper version of the installation plan as a template, a device to identify the light (when located underneath the light unit) and a pen or marker to mark up any changes on the template. This is both time consuming, costly, inflexible and is also prone to mistakes.

For example once a lighting system has been commissioned the generated light map may be checked or inspected on a regular basis to determine whether the light units are still working and/or in the correct position. The inspection of installed light units and the generation of a report including the brand, quantity, status, energy usage of the lighting system based on the inspection would be similarly both time consuming and prone to mistakes.

SUMMARY

The following provides a technique and apparatus for providing (and enabling the inspection of) a lighting system plan or lighting plan. The technique and apparatus is configured to generate (or receive) multiple overlapping images of the environment from various locations. These overlapping images may be rectified and then data from the images combined. The combination of data from the images in some embodiments is achieved by combining the rectified images directly to form a blended image and then determining light units from the blended image. The combination of data from the overlapping images in some other embodiments is performed by initially determining light unit data (otherwise known as a sparse representation of the image) from each of the overlapping images and then combining this light unit data.

Thus in some embodiments the concept may be implemented within a device or apparatus with a camera configured to capture the overlapping images. In some further embodiments the device or apparatus may be further in connection with a processing system configured to manage and process the overlapping image data.

The processing system may thus in some embodiments be configured to rectify the overlapping (ceiling) images taken by the camera, stitch or merge the rectified images into a single image, detect or determine lighting points from the single image and classify the type and status of images. From this information the lighting plan can be generated or compared against a previously determined lighting plan in order to either generate a lighting plan or verify the lighting plan or inspect the lighting system. The processing system may furthermore in some other embodiments be configured to analyze each image to determine light units in each image and classify their type and status. Furthermore the relative location of each of these determined light units in each image can be stored. Using the relative positions of the light units from multiple images a single combined map of light unit positions can be determined.

According to one aspect disclosed herein, there is provided a lighting plan generator configured to generate a lighting plan from overlapping images, the lighting plan comprising a map of locations of a plurality of light units located on a ceiling of an interior space, and the lighting plan generator comprising: an input configured to receive at least two images from a mobile device, the at least two images comprising at least partially overlapping areas captured by the mobile device from different locations as the mobile device moves through said interior space; an image rectifier configured to rectify the at least two images; an image data combiner configured to combine data from the rectified at least two images, wherein the lighting plan is generated from the combined data from the rectified at least two images.

The image data combiner may comprise an image combiner configured to generate a merged image from the rectified at least two images, wherein the lighting plan generator may comprise a light unit identifier configured to analyze the merged image to generate the lighting plan.

In such a manner the generation of the lighting plan may be performed based on receiving image data in the form of bitmap or other image data formats, processing the images to produce images with common features and then stitching or combining these images together based on these common features identified in the images in order that the combined image may then be analyzed and used to produce a lighting plan.

The lighting plan generator may comprise a light unit identifier configured to analyze the at least two images individually to determine and identify any light units within the image, wherein the image data combiner may be configured to combine the determined and identified light unit information within the individual images to generate the lighting plan.

In such a manner the generation of the lighting plan may be performed by analyzing each image individually and identifying the light units within each image. The data of the identified light units may then be combined to produce the lighting plan. In these embodiments the complete bitmap need not be stored, or transmitted from a capture device to a processing or analyzer. In other words, only the determined light unit data associated with each image is stored or transmitted and thus the amount of data stored or transmitted may be reduced and/or the captured image quality (or image pixel density) may be increased. Furthermore by analyzing the image individually the later generation of the lighting plan by combining the image data may be performed using fewer processing and memory resources.

The light unit identifier may be configured to identify any light units within the image from an identifier based on a modulation of visible light of the light unit or based on an additional infrared source in or with the light unit and modulation of the light emitted by the infrared source.

In such a manner the light units may be identified using the identifier from the light unit modulation or based on modulation from any associated infrared source associated with the light unit.

A lighting plan generating system may comprise: a device configured to capture the at least two images, the at least two images comprising at least partially overlapping areas; and the lighting plan generator as discussed herein, wherein the device may be configured to transmit the at least two images to the lighting plan generator.

In such embodiments the device configured to capture the at least two images may be a separate device or apparatus from the device configured to generate the lighting plan. As such the device for capturing the images may be any suitable device or apparatus for capturing images such as mobile phone, a robot device, a drone or similar and as such may be chosen to suit the environment within which the lighting system has been installed.

The device may be controlled by the lighting plan generator.

In such embodiments the lighting plan generator may control the device in order to capture suitable overlapping images from which the lighting plan may be generated.

The device may be an autonomous device.

In such embodiments the device configured to capture the overlapping images may be configured to operate with minimal or no user input and thus not require costly and potentially error introducing manual input.

A lighting commissioning system may comprise a lighting system generator as discussed herein, the lighting commissioning system may further comprise a report generator configured to generate a commissioning report based on the determined lighting plan.

In such embodiments the lighting commissioning system may be able to generate suitable outputs for enabling the commissioning of lighting systems in an efficient manner and with minimal errors.

A lighting commissioning system may comprise a lighting system generator as discussed herein, the lighting commissioning system may further comprise: a lighting plan determiner configured to determine an installation lighting plan; a lighting plan comparator configured to compare the installation lighting plan with the determined lighting plan; and a report generator configured to generate a commissioning report based on the comparison of the installation lighting plan with the determined lighting plan.

In such embodiments the lighting commissioning system may be able to compare the generated lighting plan against the known installation lighting plan in order to determine whether the lighting system has been correctly installed or where there is an incorrect installation the differences which may be used by any later lighting system controller to allow for the error.

When no installation plan is available, the determined lighting plan may be stored and made available for retrieval at a later date.

A lighting inspection system may comprise a lighting system generator as discussed herein, the lighting inspection system may further comprise: a lighting plan determiner configured to determine a predetermined lighting plan; a lighting plan comparator configured to compare the predetermined lighting plan with the determined lighting plan; and a report generator configured to generate an inspection report based on the comparison of the predetermined lighting plan with the determined lighting plan.

According to a second aspect there is provided a computer program product comprising code embodied on one or more computer-readable storage media and/or being downloadable therefrom, and being configured so as when run on a lighting plan generator configured to generate a lighting plan from overlapping images, the lighting plan comprising a map of locations of a plurality of light units located on a ceiling of an interior space, and the lighting plan generator being configured to perform operations of: receive at least two images from a mobile device, the at least two images comprising at least partially overlapping areas; rectify the at least two images captured by the mobile device from different locations as the mobile device moves through said interior space; combine data from the rectified at least two images; and generate the lighting plan from the combined data from the rectified at least two images.

The operation of combining data from the rectified images may comprise the operation of generating a merged image from the rectified at least two images, and the operation of generating the lighting plan from the combined data may comprise the operation of analyzing the merged image to generate the lighting plan.

The lighting plan generator may further be configured to perform the operation of analyzing the at least two images individually to determine and identify any light units within the image, and wherein the operation of combining data from the rectified images may comprise performing the operation of combining the determined and identified light unit information within the individual images, and the operation of generating the lighting plan from the combined data may comprise performing the operation of generating the lighting plan from the determined and identified light unit information.

The operation of analyzing the at least two images individually to determine and identify any light units within the image may comprise performing the operation of identifying any light units within the image from an identifier based on a modulation of visible light of the light unit or based on an additional infrared source in or with the light unit and modulation of the light emitted by the infrared source.

The lighting plan generator may further be configured to perform the operation of capturing the at least two images, the at least two images comprising at least partially overlapping areas.

The lighting plan generator may further be configured to perform the operation of controlling the capturing of the at least two images.

A lighting commissioning system may comprise the computer program product comprising code embodied on one or more computer-readable storage media and/or being downloadable therefrom, and being configured so as when run on a lighting plan generator configured to generate a lighting plan from overlapping images and further be configured to perform the operation of generating a commissioning report based on the determined lighting plan.

A commissioning system may comprise the computer program product comprising code embodied on one or more computer-readable storage media and/or being downloadable therefrom, and being configured so as when run on a lighting plan generator configured to generate a lighting plan from overlapping images and further be configured to perform the operations of: determining an installation lighting plan; comparing the installation lighting plan with the determined lighting plan; and generating a commissioning report based on the comparison of the installation lighting plan with the determined lighting plan.

A lighting inspection system may comprise the computer program product comprising code embodied on one or more computer-readable storage media and/or being downloadable therefrom, and being configured so as when run on a lighting plan generator configured to generate a lighting plan from overlapping images and further be configured to perform the operations of: determining a predetermined lighting plan; comparing the predetermined lighting plan with the determined lighting plan; and generating an inspection report based on the comparison of the predetermined lighting plan with the determined lighting plan.

According to a third aspect there is provided a method of generating a lighting plan from overlapping images, the lighting plan comprising a map of locations of a plurality of light units located on a ceiling of an interior space, the method comprising: receiving at least two images from a mobile device, the at least two images comprising at least partially overlapping areas captured by the mobile device from different locations as the mobile device moves though said interior space; rectifying the at least two images; combining data from the rectified at least two images; and generating the lighting plan from the combined data from the rectified at least two images.

Combining data from the rectified images may comprise generating a merged image from the rectified at least two images, and generating the lighting plan from the combined data may comprise analyzing the merged image to generate the lighting plan.

The method may further comprise analyzing the at least two images individually to determine and identify any light units within the image, and wherein combining data from the rectified images may comprise combining the determined and identified light unit information within the individual images, and generating the lighting plan from the combined data comprises generating the lighting plan from the determined and identified light unit information.

Analyzing the at least two images individually to determine and identify any light units within the image may comprise identifying any light units within the image from an identifier based on a modulation of visible light of the light unit or based on an additional infrared source in or with the light unit and modulation of the light emitted by the infrared source.

Receiving the at least two images may comprise capturing the at least two images, the at least two images comprising at least partially overlapping areas.

The method may further comprise controlling the capturing of the at least two images at an apparatus separate from the apparatus performing rectifying the at least two images.

A method for commissioning a lighting system comprising: generating a lighting plan as discussed herein; and generating a commissioning report based on the determined lighting plan.

A method for commissioning a lighting system may comprise: generating a lighting plan from overlapping images as described herein; determining an installation lighting plan; comparing the installation lighting plan with the determined lighting plan; and generating a commissioning report based on the comparison of the installation lighting plan with the determined lighting plan.

A method for inspecting a lighting system may comprise: generating a lighting plan from overlapping images as described herein; determining a predetermined lighting plan; comparing the predetermined lighting plan with the determined lighting plan; and generating an inspection report based on the comparison of the predetermined lighting plan with the determined lighting plan.

BRIEF DESCRIPTION OF THE DRAWINGS

To assist understanding of the present disclosure and to show how embodiments may be put into effect, reference will be made by way of example to the accompanying drawings in which.

DETAILED DESCRIPTION OF EMBODIMENTS

The concept implemented in the embodiments described herein is configured to generate a lighting plan for an interior space within which is located a lighting system comprising light units located on a surface (typically the ceiling) for providing illumination for the interior space. The generated lighting plan may then be employed within a range of various applications such as, for example, lighting system commissioning, lighting system inspection, and lighting system location estimation.

The lighting plan may comprise light unit location or position information relative to a defined datum or data. The defined datum or data may be a structural element of the interior space and the location or position information is 'absolute' location or position information. In some embodiments the defined datum or data may be other light units and the location or position information is 'relative' location or position information.

In some situations each light unit within the light plan may furthermore be identified with a code or hidden code. Each light unit may have an embedded unique identifier code which can be determined and be used to uniquely identify the light unit. The identifiable code can be embedded in the light units such as light emitting diodes as well as halogen, fluorescent and high-intensity discharge lamps. The identifier may be based on a modulation of visible light of the light unit or by placing an additional infrared source in or with the light unit and modulating the light emitted by this infrared source. LEDs are particularly well-suited for coded light systems since they can be modulated at a high frequency allowing the modulated light emissions to be modulated beyond 100 Hz rendering the data modulation substantially imperceptible to the human visual system.

The unique identifier or code emitted by the light unit may be utilized by a wide variety of tools and applications, including the identification of one or more specific light units in the presence of numerous light units, which in turn enables applications such as the indoor positioning scheme.

Figure 1:
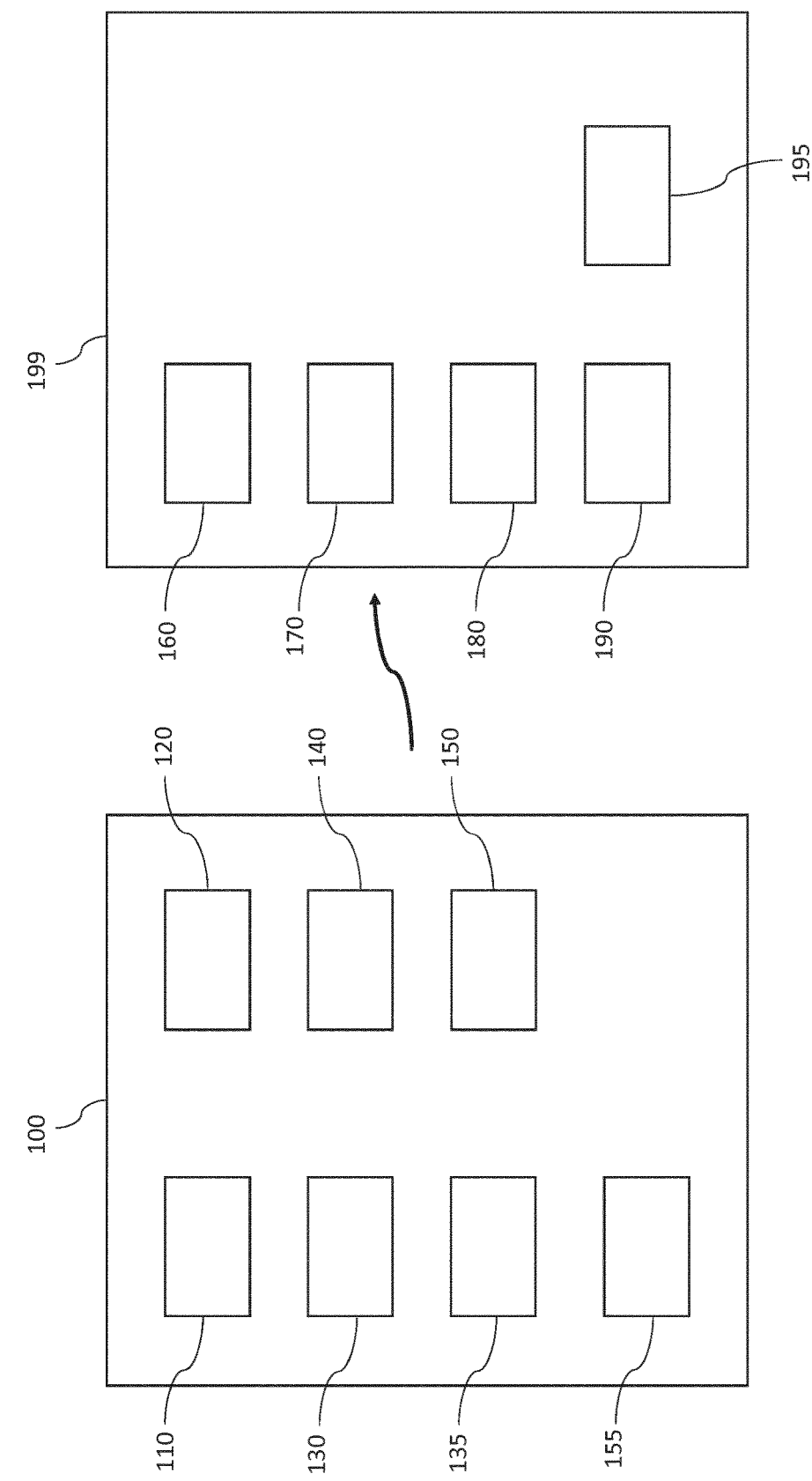
FIG. 1 is a schematic block diagram of a lighting plan generating system according to some embodiments.

With respect to FIG. 1 example apparatus for generating a lighting plan according to some embodiments are shown. In FIG. 1 the lighting plan generating system comprises a mobile user device/autonomous device 100 configured to capture overlapping images of the environment and a central management system 199 configured to process the overlapping images.

It is understood that in some embodiments the aspects of the central management system 199 may be implemented within the user device/autonomous device 100. In other words in some embodiments the functionality of the central management system 199 and the user device/autonomous device 199 may be implemented within a single apparatus or device. Similarly, in some embodiments, aspects or parts of the processing operation described hereafter may be distributed between the user device/autonomous device 100 and the central management system 199.

The user device/autonomous device 100 may be implemented in a range of apparatus. For example the user device/autonomous device functionality may be a conventional user equipment or mobile phone held by a user. The user equipment may be configured to capture the overlapping images of the light units as the user walks through the space or retail area along a defined or random path. Similarly the user device may be implemented as a tablet, laptop or other computing device with a camera which is held. The user device may be mounted on wheels, or a wheeled or tracked support (such as a trolley) and which can be pulled or pushed through the interior space capturing overlapping images of the ceiling (or other surface on which the light units are mounted).

In some environments the user device/autonomous device 100 may be self-propelled or mounted on a self-propelled support. For example the user device may be implemented on a wheeled trolley and propelled by electrical motors.

The self-propelled device may furthermore may be remote controlled, for example using a wireless controller. The self-propelled device may be manually controlled, autonomous or semi-autonomously operated.

Furthermore in some embodiments the user device may be a flying device or drone. For example the flying user device/autonomous device may be a heavier than air device (such as an axially stabilized helicopter) or a lighter than air device (such as an autonomous airship).

The user device/autonomous device 100 may comprise a camera or image capturing device 110. The camera 110 may be configured to capture images of the environment within which the user device is operating. Typically the camera is orientated or stabilized such that the images captured are overlapping images of the ceiling of the interior space. However in some embodiments the camera 110 may be configured to capture images of any surface on which the light units are employed. The camera 110 may be any suitable camera or imaging array. In some embodiments the camera 110 may be configured to further determine a depth or distance from the camera to the surface. For example in some embodiments the camera 110 is a stereoscopic image determiner configured to determine a depth or distance based on comparing the parallax differences.

The user device/autonomous device 100 may further comprise a location/orientation detector 120. The location/orientation detector 120 may be configured to provide some location and/or orientation information which may be used to tag the captured images and be used in the processing of the overlapping images. The location/orientation detector 120 may for example comprise a gyroscope or digital compass.

The user device/autonomous device 100 may further comprise a processor 130 and memory 135. The processor 130 can in some embodiments be configured to execute various program codes. The implemented program codes in some embodiments comprise image capture control, image processing, and image encoding as described herein.

The user device/autonomous device 100 may further comprise memory 135. The implemented program codes can in some embodiments be stored for example in the memory 135 for retrieval by the processor 130 whenever needed. The memory 135 could further provide a section for storing data, for example image data in accordance with the application as described herein.

The user device/autonomous device may further comprise a transmitter 140 (or a transceiver).

The user device/autonomous device 100 may thus be wirelessly in communication with the central management system 199. The transmitter (or transceiver) may communicate with other apparatus by any suitable known communications protocol. For example in some embodiments the transmitter can use a suitable universal mobile telecommunications system (UMTS) protocol, a wireless local area network (WLAN) protocol such as for example IEEE 802.X, or a suitable short-range radio frequency communication protocol such as Bluetooth.

The user device/autonomous device 100 may further comprise a user interface 150.

The user interface (UI) 150 may enable a user to input commands to the user device 100. The user interface 150 may be a keypad or other suitable input device.

The user device/autonomous device 100 may further comprise a display 155. The display 155 is configured to present information about the user device/autonomous device. In some embodiments a touch screen may provide both user interface 150 input and display 155 output functions.

In the following embodiments the user device/autonomous device 100 is configured to provide to the central management system 199 a series of overlapping images which cover the ceiling of the interior for which the lighting map is being generated. In such embodiments the user device/autonomous device 100 camera 110 is configured to capture the images, which can be encoded using the processor 130 and passed to the transmitter 140 for transmission to the central management system 199. In some embodiments the location detector 120 may be further configured to pass location/orientation estimates to the processor and these location/orientation estimates may be attached to the images to also be transmitted to the central management system 199.

Figure 6:
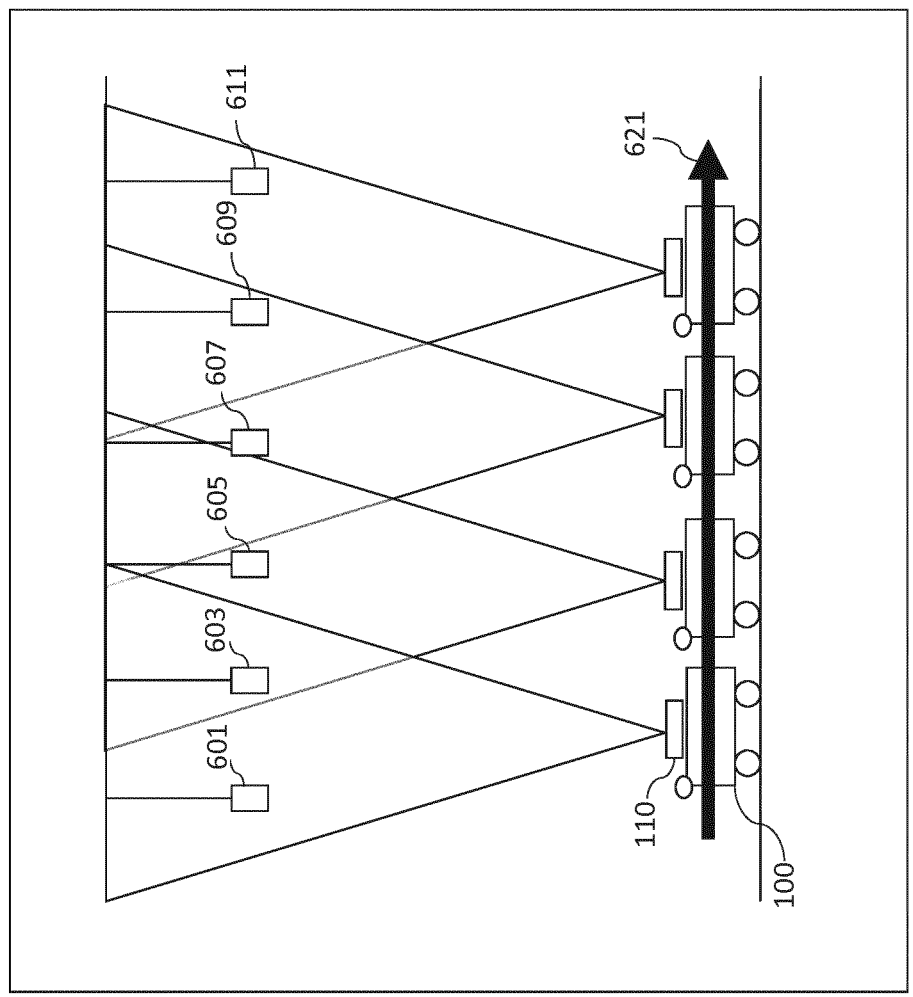
FIG. 6 shows an example operation of a user device/autonomous device as shown in FIG. 1.

With respect to FIG. 6 an example user device 100 moving through an interior space capturing overlapping images is shown. The user device 100 is shown at various positions within the interior space, and represents a series of time instances where the user device 100 is moved in the direction shown by arrow 621 along the floor. At each instant the camera 110 is configured to capture an image of which each image overlaps at least partially with one other image. Thus at the first instant the camera 110 is configured to capture an image comprising the first 601 light unit and the second light unit 603. At the second instant the camera 110 is configured to capture an image comprising the second light unit 603, the third light unit 605 and partially the fourth light unit 607. At the third instant the camera 110 is configured to capture an image comprising the fourth 607 light unit and the fifth light unit 609. At the fourth instant the camera 110 is configured to capture an image comprising the fifth 609 light unit and the sixth light unit 611.

The central management system 199 may comprise a receiver 160 (or transceiver). The user central management system 199 may thus be wirelessly in communication with the user device 100. For example the central management system 199 may be configured to receive the overlapping images captured by the user device 100. The receiver (or transceiver) may communicate with other apparatus by any suitable known communications protocol. For example in some embodiments the receiver can use a suitable universal mobile telecommunications system (UMTS) protocol, a wireless local area network (WLAN) protocol such as for example IEEE 802.X, or a suitable short-range radio frequency communication protocol such as Bluetooth.

The central management system 199 may further comprise a processor at 170 and memory 180. The processor 170 can in some embodiments be configured to execute various program codes. The implemented program codes in some embodiments comprise image processing, lighting map generation, commissioning report generation using the generated lighting map, and inspection report generation using the generated lighting map.

The central management system may further comprising memory 180. The implemented program codes can in some embodiments be stored for example in the memory 180 for retrieval by the processor 170 whenever needed. The memory 180 could further provide a section for storing data, for example image data in accordance with the application as described herein.

The central management system 199 a further comprise a user interface 190.

The user interface (UI) 190 may enable a user to input commands to the central management system 199. The user interface 190 may be a keypad or other suitable input device.

The central management system may further comprise a display 195. The display 195 is configured to present information about the central management system. In some embodiments a touch screen may provide both user interface 190 input and display 195 output functions.

Figure 2:
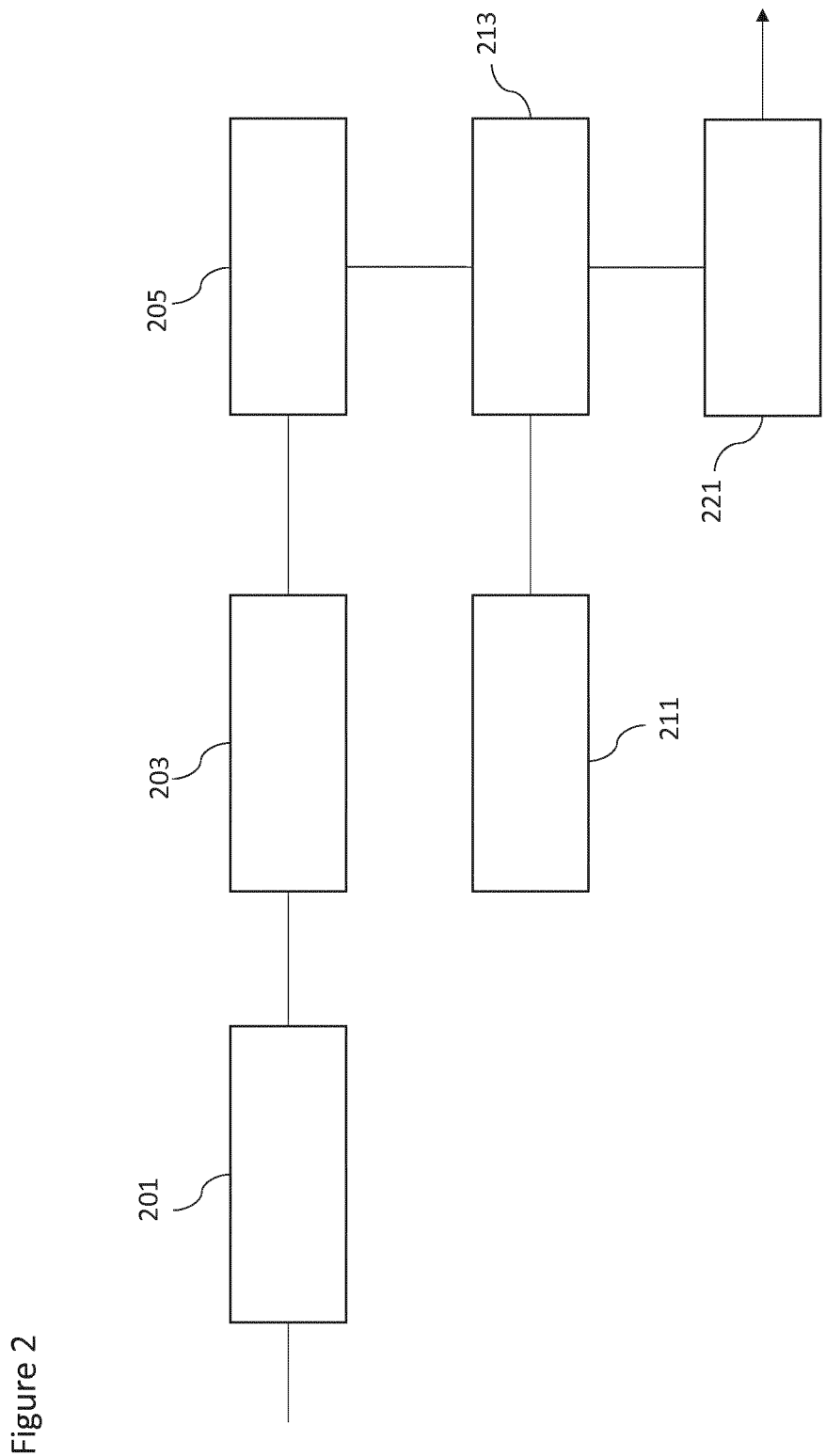
FIG. 2 is a schematic block diagram of functional components of a first lighting plan generator according to some embodiments.

With respect to FIG. 2 functional entities implemented within the central management system 199 for a first lighting plan generator are shown in further detail. In this example the lighting plan generator is employed within a lighting system inspection system and as such compares the light unit information within the lighting plan with a predetermined (where it is available) lighting plan. The predetermined lighting plan described with respect to this example may be a previously determined lighting plan or may be an installation lighting plan.

In some embodiments of the central management system 199 further comprises an image rectifier 201. The image rectifier 201 may be configured to receive the overlapping images and process the image to compensate for camera lens and/or user device orientation errors such that data within the images may be combined. The image rectifier 201 may for example be configured to identify the shooting angle or the pose angle of the camera. Following the determination of the shooting angle of the image the image rectifier may then be configured to process the image based on the shooting angle to form a rectified image. The rectified image may then be passed to the image combiner 203.

In some embodiments the central management system 199 further comprises an image combiner 203. The image combiner 203 may be configured to receive the rectified images from the image rectifier 201 and combine or blend the images to form a single combined or blended image. This combined or blended image may then be passed to a light unit identifier 205.

In some embodiments the central management system 199 comprises a light unit identifier 205. The light unit identifier 205 may be configured to receive the blended or combined image from the image combiner 203. Furthermore the light unit identifier 205 may be configured to identify from the blended image the light units within the image. Furthermore the light unit identifier 205 may be configured to identify the type of light unit, the position (or relative position) of the light unit, and the status of the light units. The light unit identifier 205 may also be configured to determine other suitable parameters or characteristics of the light units identified. For example the light unit identifier may determine the make of the light unit. The identified light unit values from the blended image can then be passed to a lighting comparator 213.

In some embodiments the central management system 199 further comprises a lighting plan determiner 211. The lighting plan determiner 211 may be configured to determine and/or retrieve a previously determined lighting plan. The previously determined lighting plan may then be passed to the lighting comparator 213. The lighting plan determiner 211 may be configured to output a light plan in the same format as the information generated by the light unit identifier 205.

In some embodiments the central management system 199 comprises a lighting plan comparator 213. The lighting plan comparator 213 may be configured to compare the information from the light unit determiner against the information from the lighting plan determiner. The output of the lighting plan comparator 213 can then be passed to a report generator 221.

In some embodiments the central management system 199 comprises a report generator 221. The report generator may be configured to receive the output of the lighting plan comparator 213 and further be configured to generate a report based on the differences between the lighting plan information from the lighting plan determiner and the identified light unit information.

In some embodiments, where there is no predetermined lighting plan available from the lighting plan determiner 211, the lighting plan comparator 213 may issue an indicator to the report generator 221 to output the identified light unit information as a new lighting plan. This 'new' lighting plan may be stored and be available for retrieval at a later date by the lighting plan determiner 211.

Figure 3:
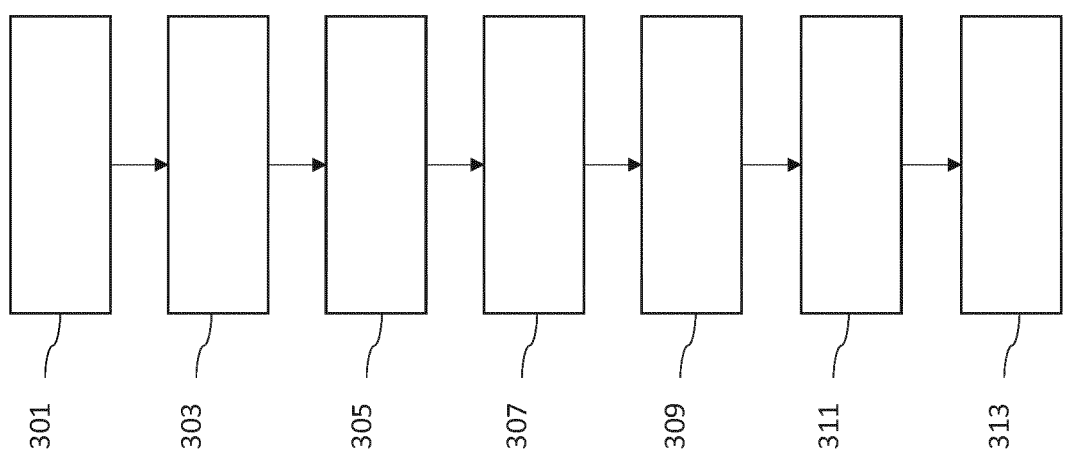
FIG. 3 shows a flow diagram of a first lighting plan generation method implementing the lighting plan generator as shown in FIG. 2.

With respect to FIG. 3 an example flow diagram of the operation of the central management system 199 as shown in FIG. 2 is shown.

In some embodiments the central management system 199 is configured to receive the overlapping images from the user device. The overlapping images may be received on an ongoing or sequential basis wherein the images are uploaded to the central management system 199 as the user device captures images. In some embodiments the overlapping images may be received as a batch process, wherein the user device 100 is configured to upload multiple images or all of the images at the same time.

The operation of receiving the overlapping images is shown in FIG. 3 by step 301.

The overlapping images may then be rectified by the image rectifier 201.

Figure 10:
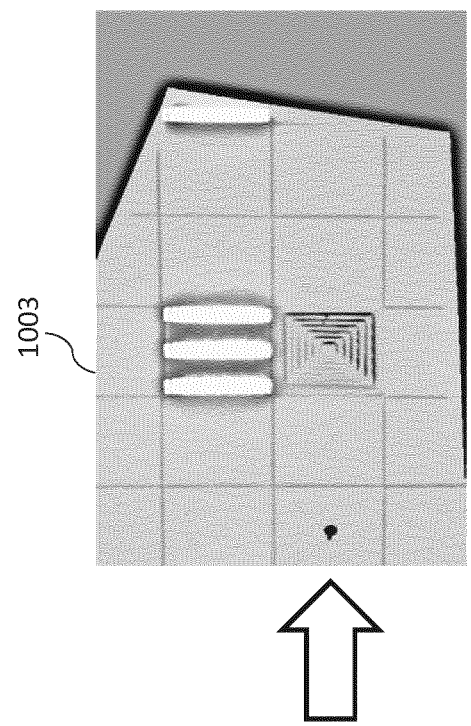
FIG. 10 shows an example rectification operation with respect to an example image.
Figure 10:
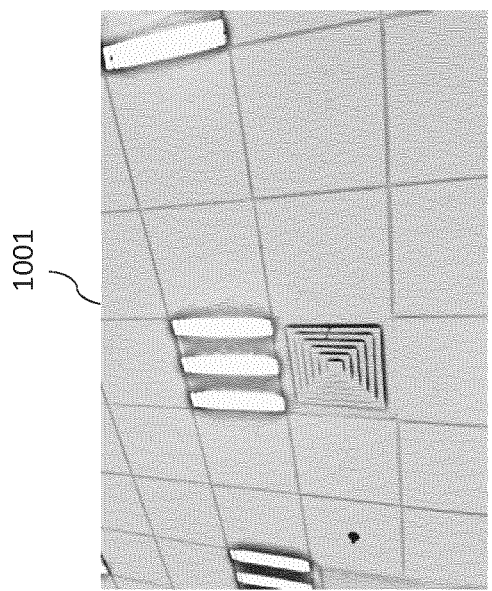

With respect to FIG. 10 an example warping of an image is shown wherein the initial image 1001 is warped or rectified according to the methods as described herein to form a warped (or mapped or rectified) image 1003. In such an example the original image shows the 'square' feature as a non-regular quadrangle which when warped is shown as a 'square'.

The operation of rectifying the overlapping images is shown in FIG. 3 by step 303.

The rectified images can then be combined or blended to form a single combined or blended image by the image combiner 203.

Figure 12:
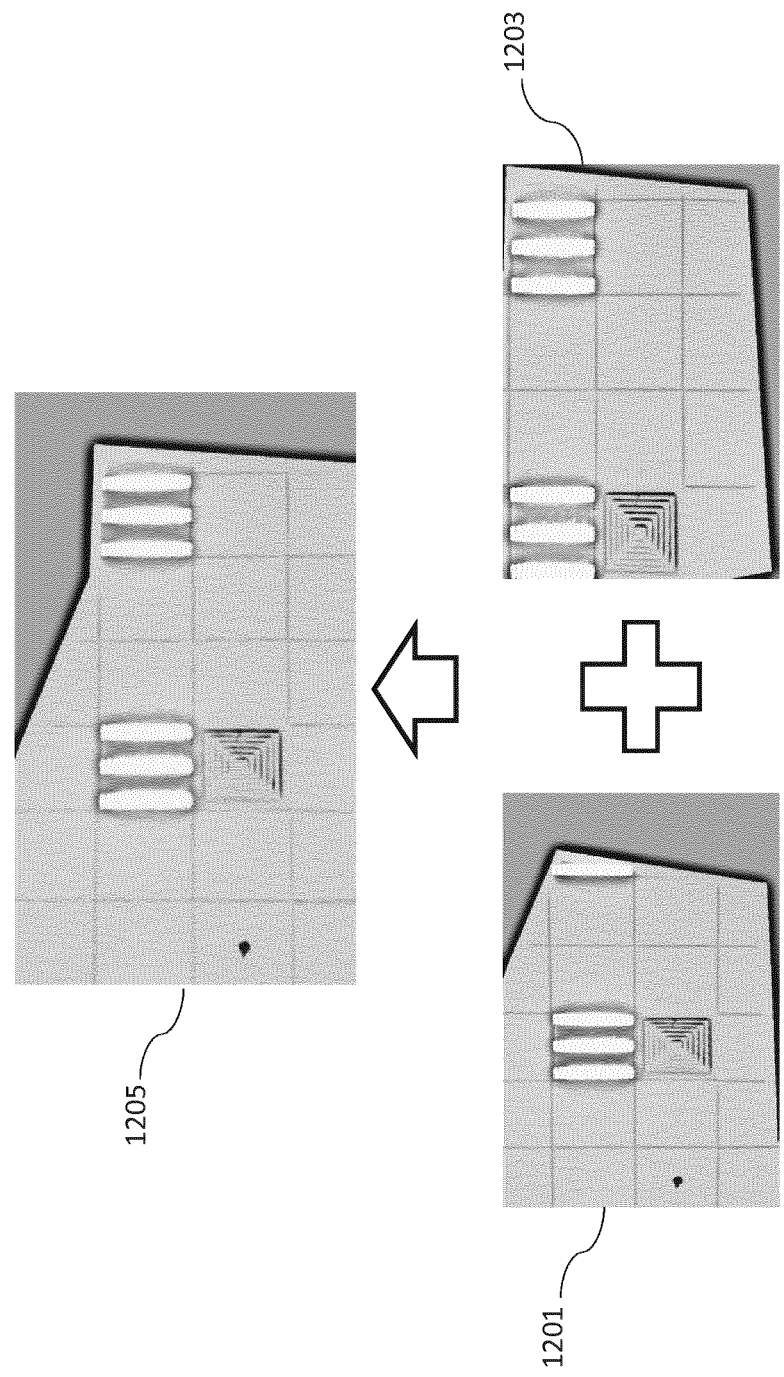
FIG. 12 shows an example combination operation with respect to a pair of example images.

With respect to FIG. 12 an example blending or combining of the images is shown wherein a first image 1201 and a second image 1203 are shown as being blended or combined to form a blended or combined image 1205.

The operation of generating a blended image from the rectified images is shown in FIG. 3 by step 305.

The combined or blended image may then be analyzed within the light unit identifier to identify light units. The light units can be identified in terms of the type of light unit, make of light unit, position of light unit and status of the light unit.

Figure 13:
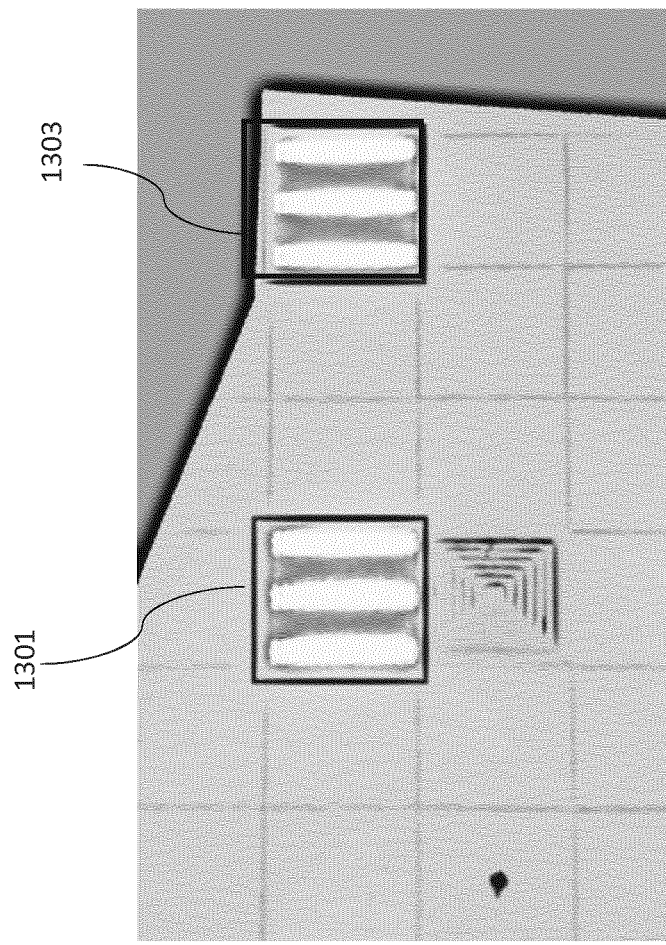
FIG. 13 shows an example light unit identifier operation with respect to an example image.

With respect to FIG. 13 an example light unit identification operation is shown. Within the image the lighting units 1301 and 1303 are identified as having 3 separate light source elements each.

The operation of identifying light units from the blended image is shown in FIG. 3 by step 307.

Furthermore in some embodiments it can be determined whether there is a predetermined lighting plan stored. This predetermined lighting plan can be retrieved by the lighting plan determiner 211 and the predetermined lighting plan may be passed to a lighting plan comparator 213.

The operation of determining a predetermined lighting plan is shown in FIG. 3 by step 309.

The identified light unit information may then be compared against the information from the predetermined lighting plan information.

The operation of comparing the information from the predetermined lighting plan against information about the identified light units is shown in FIG. 3 by step 311.

Then lighting plan report may be generated, for example by the report generator, based on the comparison between the information from the predetermined lighting plan against the information about the identified light units.

The operation of generating the lighting plan report based on the comparison is shown in FIG. 3 by step 313.

Figure 14:
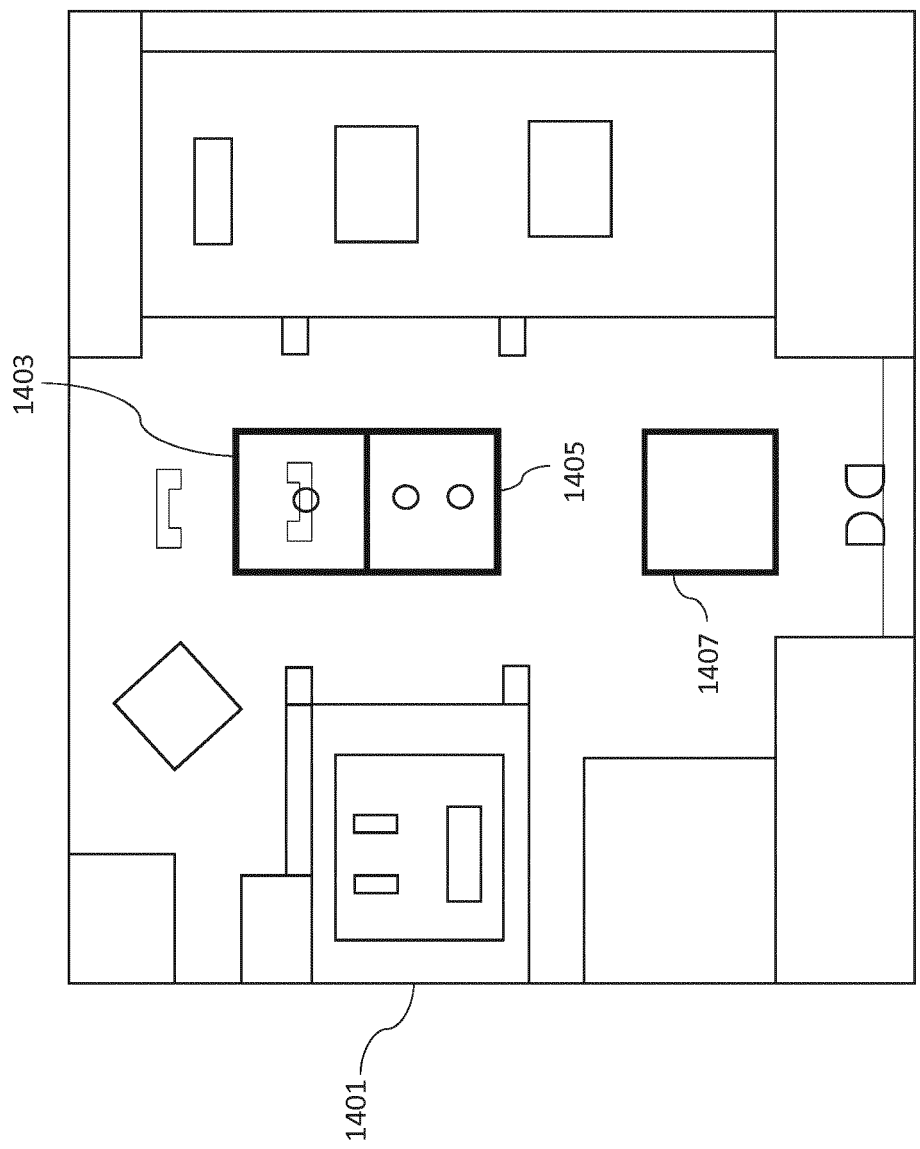
FIG. 14 shows an example lighting plan overlaying an installation plan.

Thus for example with respect to FIG. 14 is shown an example lighting plan report wherein the light units 1403, 1405 and 1407 are identified and located over the plan 1401 of the interior space.

Figure 4:
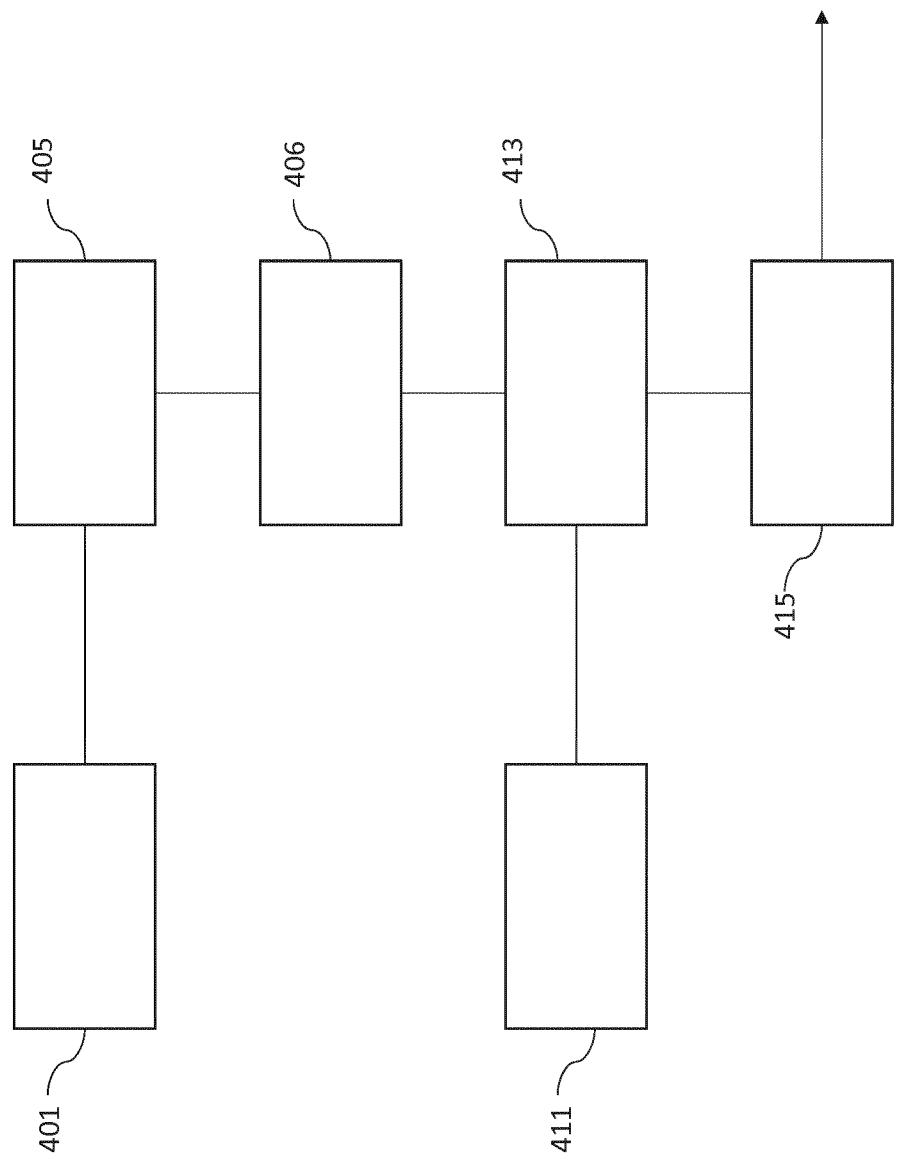
FIG. 4 is a schematic block diagram of functional components of a second lighting plan generator according to some embodiments.

With respect to FIG. 4 functional entities implemented within the central management system 199 for a further lighting plan generator are shown in further detail. The further lighting plan generator in this example is one where the lighting plan is generated from combining data determined from images rather than combining the bitmaps associated with the images. In such embodiments as described herein as the image data is not bitmaps data but determined data comprising coordinates and codes from the found and identified coded lights in the image. Thus in such embodiments for a large area there is a significantly smaller amount of storage required or otherwise higher detail images can be 'stored' enabling a higher accuracy of lighting unit determination. Furthermore by applying the operation of finding and identifying the light unit from each image and then combining the image data in the form of the co-ordinates for the found and identified light units the combination or 'stitching' of this data to form the lighting plan is much easier and requires less processing capacity. Although in this example the processing of the image to determine the image data is performed within the central management system 199 it is understood that in some embodiments the operation of processing the image to determine the image data and/or the operation of stitching or combining the determined data may be performed within the capture device.

Furthermore the examples as discussed hereafter enable an integral lighting plan comprising the light units and their codes (which would have to be determined separately from the integral lighting plan method discussed above).

In the following example the further lighting plan generator is implemented within a lighting system commissioning system wherein the determined light unit information is compared against the installation lighting plan to determine whether the light units have been installed correctly. The overlapping images may be received on an ongoing or sequential basis wherein the images are uploaded to the central management system 199 as the user device captures images. In some embodiments the overlapping images may be received as a batch process, wherein the user device 100 is configured to upload multiple images or all of the images at the same time.

In some embodiments of the central management system 199 further comprises an image rectifier 401. The image rectifier 401 may be configured to receive the overlapping images and process each image to compensate for camera lens and/or user device orientation errors such that data within the images may be combined. The image rectifier 401 may for example be configured to identify the shooting angle or the pose angle of the camera. Following the determination of the shooting angle of the image the image rectifier may then be configured to process the image based on the shooting angle to form a rectified image. The rectified image may then be passed to a light unit identifier 405. The image rectifier 401 may furthermore scale the image such that each image is uniformly scaled. For example the output of the image rectifier may be such that each image each image the images may be analyzed and the resultant analysis output directly compared.

The camera lens errors or other non-linear features (and the compensation) may be determined by comparing a sequence of images and using identified features within the images comparing distances or angles between the features. For example any distances or angles between features (such as identified light units) which differ between images (which have been rectified and scaled to compensate for the differences in camera orientation) may be registered and used to generate a mapping or scaling to compensate for the differences. In other words the position of the features (such as the light units) may be triangulated from the images, with the camera lens errors or other non-linear features appearing as differences between the triangulated positions and the individual image position.

In some embodiments the central management system 199 comprises a light unit identifier 405. The light unit identifier 405 may be configured to receive the rectified images from the image rectifier 401. Furthermore the light unit identifier 405 may be configured to identify from the rectified image the light units within the image. This may be performed by determining and then identifying an associated code with the light unit as discussed earlier. Furthermore the light unit identifier 405 may be configured to identify the type of light unit, the position (or relative position) of the light unit within the image, and the status of the light units. The light unit identifier 405 may also be configured to determine other suitable parameters or characteristics of the light units identified. For example the light unit identifier may determine the make of the light unit. The identified light unit values from the blended image can then be passed to a lighting data combiner 406.

Figure 7:
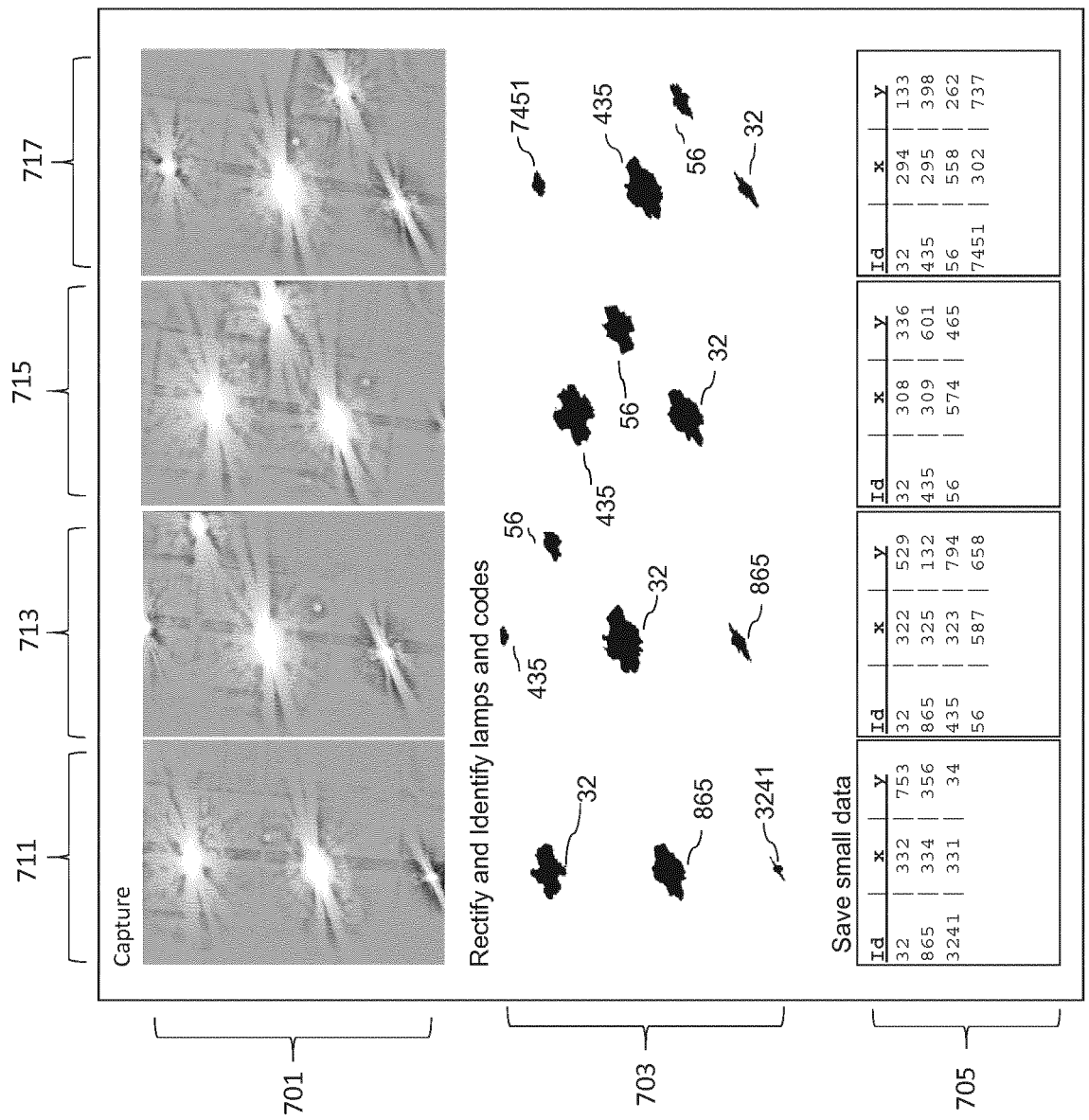
FIG. 7 shows an example sequence of overlapping images, light unit image data, and light unit data for the second lighting plan generation method.

FIG. 7 shows an example operation of the light unit identifier according to some embodiments.

Thus for example FIG. 7 shows a series of captured overlapping images 701. The overlapping images comprise a first image 711, a second image 713, a third image 715 and a fourth image 715. These images may, for example, be captured using a camera 110 mounted on user device 100 such as shown in FIG. 6 and as such the image capture position differs from image to image by a displacement in a single dimension.

These overlapping images may then be rectified (in other words mapped to correct any differences in scale, angle and lens distortion) and then analyzed to identify and light units within each of the images. This analysis is shown in the series of image and light identifier labels 703. Thus from the first image 711 is shown the identified light units with the identifiers #32, #865 and #3241, from the second image 713 the light units with the identifiers #56, #435, #32, and #865 are identified, from the third image 715 the light units with the identifiers #56, #435, and #32 are identified and from the fourth image 717 the light units with the identifiers #7451, #435, #56, and #32 are identified. Furthermore the analysis of each image provides an image position which may then be associated with each light unit identifier.

In such a manner the generation of the lighting plan may be performed by analyzing each rectified image individually and identifying the light units within each image. The identified light units within the image may be registered with the light unit number or identifier and the position of the light unit within the rectified image.

The data (the image identifier, the light unit identifier, and the position within the rectified image) associated with the identified light units may then be combined to produce the lighting plan. In these embodiments the complete bitmap for the image need not be stored, or transmitted from a capture device to a separate processing device or analyzer.

In such embodiments only the determined light unit data associated with each image is stored or transmitted and thus the amount of data stored or transmitted may be reduced and/or the captured image quality (or image pixel density) may be increased. Furthermore by analyzing the image individually the later generation of the lighting plan by combining the image data may be performed using fewer processing resources and memory resources.

In other words the light unit identifier 405 is applied to individual rectified images to generate a 'sparse' image representation of the images which are combined to form the lighting plan rather than generating a 'complete' image representation which is then analyzed by the light unit identifier 205 such as shown in the earlier method.

In some embodiments the central management system 199 comprises a lighting data combiner 406. The lighting data combiner 406 may be configured to receive the identified light unit information data and combine this information in such a manner that the image data is consistent between the overlapping 'sparse' images. The 'combined' light unit information may then be passed to a lighting plan comparator 413.

In this example the images are captured and sent to the lighting plan generator to be rectified, analyzed to determine the light units and positions within each image and then the image data combined. In such embodiments the capture device or the management system may comprise a model of the used camera and the angle of the camera is also known. The rectification of the images may be performed (to correct for scale and angle and distortion) inside the device. The compensated coordinates and codes from the light are stored. The combination of these 'sparse' images to generate a complete lighting plan may be performed by a simple overlaying of the overlapping 'sparse' image values as all coordinates are already compensated for.

However in some embodiments the rectification of the captured images is performed by initially passing the unrectified images to a light unit identifier, where the light units are identified and image coordinates and codes identifying the specific light are stored for each identified light. In such embodiments the camera may furthermore determine or estimate camera position and orientation (camera pose) values such as angle, height, and X-Y delta absolute for each captured image. This data may be passed to a rectifier which stores or defines a model of the camera and based on the camera model and camera pose values may map or convert the co-ordinates in terms of scale, angle and lens-distortion to output 'rectified' co-ordinates which may be combined with other image 'rectified' co-ordinates into a 'full' set of coordinates. The combination of these 'rectified' co-ordinates may be performed as described hereafter.

Furthermore the capture device may further comprise the light unit identifier and be configured to determine the light units and their associated rectified coordinates and codes from the images. This information may be stored on the capture device and uploaded to the lighting plan generator at a later time. Thus the lighting plan comparison and generation may be performed off-line as all of the image coordinates are already compensated for.

Another example may be to use the information on movement of the camera to determine the rectification mapping. In such examples by capturing many pictures the lighting plan generator and/or capture device can 'learn' or determine the camera movement/angle from the difference in the light units within the images. Thus the system may determine any suitable rectification or compensation mapping to correct the image.

Figure 9:
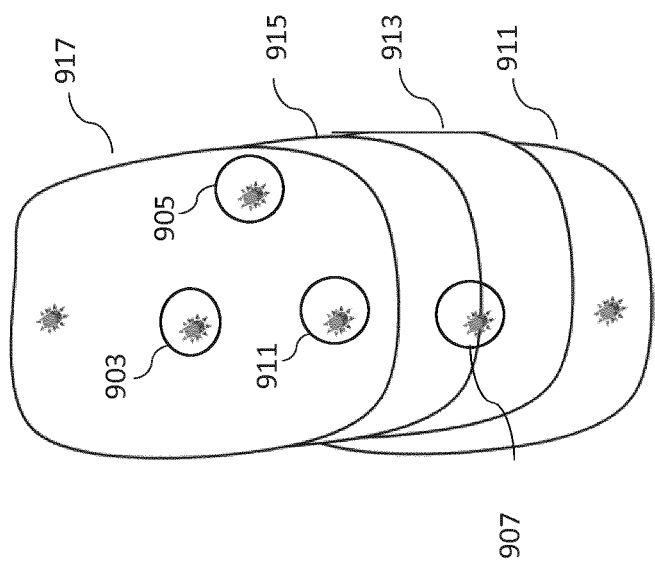
FIGS. 8 and 9 show example combined light unit data before and after applying triangulation to the light unit image data.
Figure 8:
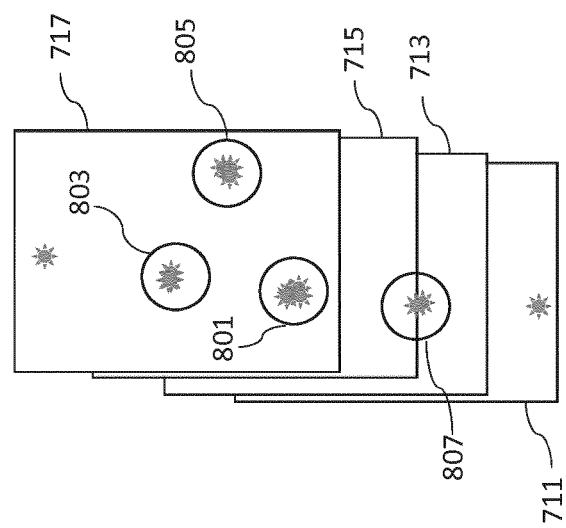

With respect to FIGS. 8 and 9 the operation of performing image combination (or image data combination) before and after image (or image data) rectification/error compensation is shown. FIG. 8 for example shows example images 811, 813, 815, 817. In this example the images 811, 813, 815 and 817 and the identified light units in each image are shown. Furthermore it can be seen that due to the differences in measurement locations (due to errors in the image capturing process) and other camera errors that the overlaying of the images produces when the images are combined light unit locations which are 'blurred' and do not have a consistent point. This can be seen for example by the light units which are shown as occurring in multiple locations represented by regions 801, 803, 805 and 807.

However where the images (or the image data, such as the light unit coordinates) are rectified or mapped to compensate for the errors in the camera (such as lens distortion/aberration) and movement of the camera such that a single or consistent position for the light units can be determined such as shown in FIG. 9 wherein the images 811, 813, 815, and 817 from FIG. 8 are rectified (or mapped) to form images 911, 913, 915 and 917 respectively and which when combined have a single consistent light unit position for each of the identified light units 901, 903, 907, 905. In the example shown in FIG. 9 the rectification of the image is represented by the 'warping' of the image boundary from a rectangle to an irregular shape.

In some embodiments the central management system 199 further comprises a lighting plan determiner 411. The lighting plan determiner 411 may be configured to determine and/or retrieve an installation lighting plan. The installation lighting plan may then be passed to the lighting comparator 413. The lighting plan determiner 411 may be configured to output the light unit information in the same format as the information generated by the lighting data combiner 406.

In some embodiments the central management system 199 comprises a lighting plan comparator 413. The lighting plan comparator 413 may be configured to compare the information from the lighting data combiner 406 against the information from the lighting plan determiner 411. The output of the lighting plan comparator 413 can then be passed to a report generator 415.

In some embodiments the central management system 199 comprises a report generator 415. The report generator 415 may be configured to receive the output of the lighting plan comparator 413 and further be configured to generate a report based on the differences between the lighting plan information from the lighting plan determiner and the identified light unit information.

Figure 5:
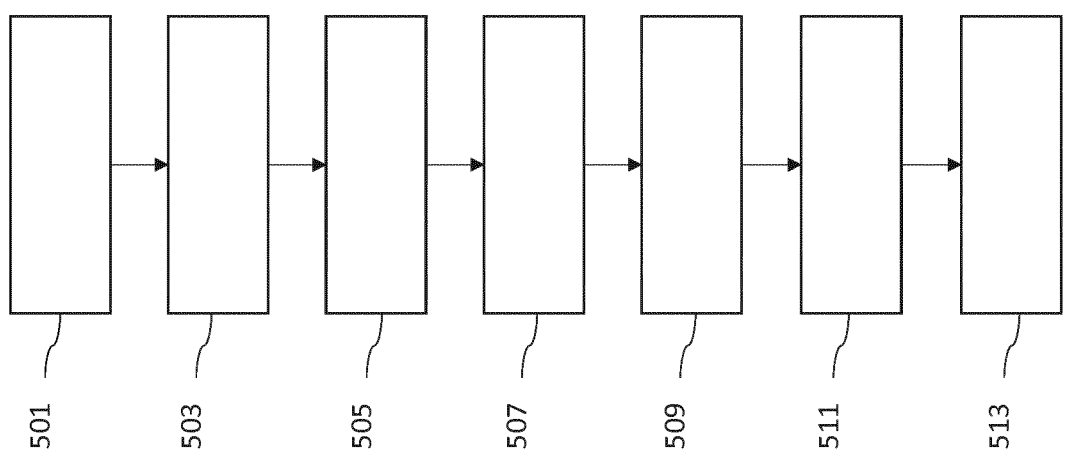
FIG. 5 shows a flow diagram of a second lighting plan generation method implementing the lighting plan generator as shown in FIG. 4.

With respect to FIG. 5 an example flow diagram of the operation of the central management system 199 as shown in FIG. 4 is shown.

In some embodiments the central management system 199 is configured to receive the overlapping images from the user device. The overlapping images may be received on an ongoing or sequential basis wherein the images are uploaded to the central management system 199 as the user device captures images. In some embodiments the overlapping images may be received as a batch process, wherein the user device 100 is configured to upload multiple images or all of the images at the same time.

The operation of receiving the overlapping images is shown in FIG. 5 by step 501.

The overlapping images may then be rectified by the image rectifier 401.

The operation of rectifying the overlapping images is shown in FIG. 5 by step 503.

The rectified images can then be individually analyzed to determine the light unit information by the light unit identifier 406. The light units can be identified in terms of the type of light unit, make of light unit, position of light unit and status of the light unit.

The operation of identifying light unit information from the rectified images is shown in FIG. 5 by step 505.

The identified light unit information may then be combined, to determine a light unit position from image light unit information from multiple images.

The operation of determining the position of the light unit positions from the overlapping image data is shown in FIG. 5 by step 507.

Furthermore in some embodiments the installation or predetermined lighting plan is determined. This lighting plan can be retrieved by the lighting plan determiner 411 and the predetermined lighting plan may be passed to a lighting plan comparator 413.

The operation of determining an installation or predetermined lighting plan is shown in FIG. 5 by step 509.

The identified light unit information may then be compared against the information from the installation lighting plan information.

The operation of comparing the information from the installation lighting plan against information about the identified light units is shown in FIG. 5 by step 511.

Then commissioning lighting plan report may be generated, for example by the report generator, based on the comparison between the information from the predetermined lighting plan against the information about the identified light units.

The operation of generating the lighting plan report based on the comparison is shown in FIG. 5 by step 513.

Figure 11:
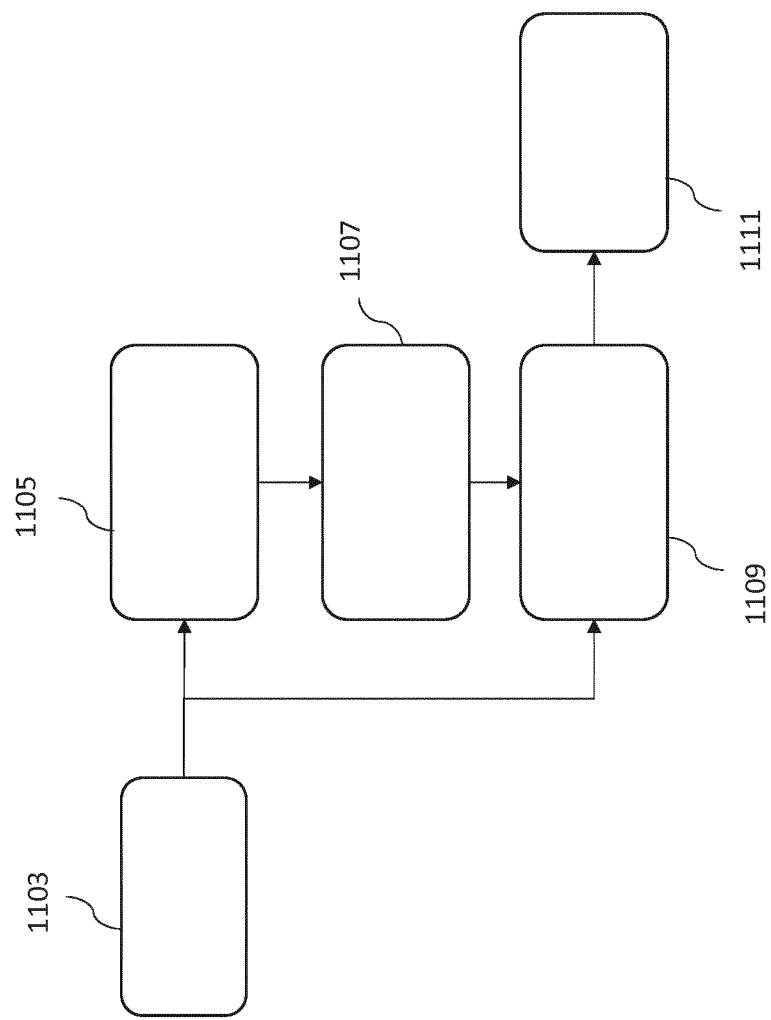
FIG. 11 shows an example image rectification and combination method according to the first lighting plan generation method.

With respect to FIG. 11 an example rectification and combination operation such as performed by the image rectifier 201 and image combiner 203 is shown in further detail.

The rectification operation comprises a first stage of inputting the images.

The operation of inputting images is shown in FIG. 11 by step 1103.

The first set of operations performed on the images may be a series of image registration operations. The registration operations aim to determine a series of features which are common to at least two images and from which registration data may be determined in order to 'rectify' or otherwise map the images and so enable the images to be combined.

With respect to the image registration operations the input images may be resized in a medium resolution. From these images suitable features are found in the images. The determined or found features may be matched over a series of images. Then images and matched feature subsets may be selected in order to generate registration data in order to rectify the images and build the combined image.

The operation of registering the images is shown in FIG. 11 by step 1105.

The registration data for determining the mapping of the images may then be generated. This may be performed for example by initially estimating camera parameters based on comparing the identified registration features from image to image for a subset of the features and images. These camera parameters or registration data may further be refined using more identified registration features or images.

The operation of generating the registration data for mapping the images is shown in FIG. 11 by step 1107.

The registration data may then be applied to the input images to composite the images in order to map the images (for rectification purposed) to form a single combined image.

The compositing of the images is shown in FIG. 11 by step 1109.

In some embodiments the compositing operation may correct for differences in any intrinsic and extrinsic camera error. For example in some embodiments the images may be corrected for exposure errors as well as positional errors or lens aberration errors.

The composited image can then be output as a final image.

The operation of outputting the composited image is shown in FIG. 11 by step 1111.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting plan generating system comprising:
   a mobile device configured to capture the at least two images, the at least two images comprising at least partially overlapping areas captured by the mobile device from different locations as the mobile device moves through an interior space; and
   a lighting plan generator configured to generate a lighting plan from the overlapping images, the lighting plan comprising a map of locations of a plurality of light units located on a ceiling of an interior space, wherein the mobile device is configured to transmit the at least two images to the lighting plan generator;
   wherein the lighting plan generator comprises:
      an image rectifier configured to rectify the at least two images;
      an image data combiner configured to combine data from the rectified at least two images, wherein the lighting plan is generated from the combined data from the rectified at least two images,
   wherein the mobile device is controlled by the lighting plan generator.

2. The lighting plan generating system as claimed in claim 1, wherein the mobile device is an autonomous device.

3. A method of generating a lighting plan from overlapping images, the lighting plan comprising a map of locations of a plurality of light units located on a ceiling of an interior space, and the method comprising:
   receiving at least two images from a mobile device, the at least two images comprising at least partially overlapping areas captured by the mobile device from different locations as the mobile device moves through said interior space;
   rectifying the at least two images, using a lighting plan generator;
   combining data from the rectified at least two images; and
   generating the lighting plan, using the lighting plan generator, from the combined data from the rectified at least two images,
   wherein the mobile device is controlled by the lighting plan generator.

4. The method as claimed in claim 3, wherein combining data from the rectified images comprises generating a merged image from the rectified at least two images, and generating the lighting plan from the combined data comprises analyzing the merged image to generate the lighting plan.

5. The method as claimed in claim 3, further comprising analyzing the at least two images individually to determine and identify any light units within the image, and wherein combining data from the rectified images comprises combining the determined and identified light unit information within the individual images, and generating the lighting plan from the combined data comprises generating the lighting plan from the determined and identified light unit information.

6. The method as claimed in claim 5, wherein the determination and identification of the light units within the image further comprises classifying at least one of a type and a status of the respective light units.

7. The method as claimed in claim 5, wherein the identification of the light units comprises identifying any light units within the image from an identifier based on a modulation of visible light of the light unit or based on an additional infrared source in or with the light unit and modulation of the light emitted by the infrared source.

8. A lighting commissioning method comprising generating a lighting plan as claimed in claim 3, the lighting commissioning method further comprising:
   determining an installation lighting plan;
   comparing the installation lighting plan with the determined lighting plan; and
   generating a commissioning report based on the comparison of the installation lighting plan with the determined lighting plan.

9. The lighting plan commissioning method as claimed in claim 8, configured so that when no installation plan is available, the determined lighting plan is stored and made available for retrieval at a later date.

10. A lighting inspection method comprising generating a lighting plan as claimed in claim 3, the lighting inspection method further comprising:
  determining a predetermined lighting plan;
  comparing the predetermined lighting plan with the determined lighting plan; and
  generating an inspection report based on the comparison of the predetermined lighting plan with the determined lighting plan.

* * * * *